(12) United States Patent
Barreda

(10) Patent No.: US 11,555,549 B2
(45) Date of Patent: Jan. 17, 2023

(54) ACCURACY ENHANCING VALVE ASSEMBLY AND METHOD

(71) Applicant: MICROFLOW, LLC, A DELAWARE LIMITED LIABILITY COMPANY, Marietta, GA (US)

(72) Inventor: Fabian Mauricio Barreda, Boynton Beach, FL (US)

(73) Assignee: MICROFLOW, LLC, a Delaware Limited Liability Company, Marietta, GA (US)

( * ) Notice: Subject to any disclaimer, the term of this patent is extended or adjusted under 35 U.S.C. 154(b) by 252 days.

(21) Appl. No.: 16/586,943

(22) Filed: Sep. 28, 2019

(65) Prior Publication Data
US 2020/0025300 A1    Jan. 23, 2020

Related U.S. Application Data

(63) Continuation of application No. 15/899,119, filed on Feb. 19, 2018, now Pat. No. 10,428,963, which is a
(Continued)

(51) Int. Cl.
*F16K 15/06* (2006.01)
*E03C 1/10* (2006.01)
*G05D 7/01* (2006.01)

(52) U.S. Cl.
CPC ......... *F16K 15/063* (2013.01); *G05D 7/0133* (2013.01); *E03C 1/104* (2013.01); *E03C 1/108* (2013.01); *Y10T 137/7934* (2015.04)

(58) Field of Classification Search
CPC .... F16K 15/063; F16K 15/021; F16K 15/025; F16K 15/026; F16K 15/028; F16K 15/06; F16K 15/066; G05D 7/0133; E03C 1/104; E03C 1/108; E03B 7/077; Y10T 137/0402; Y10T 137/04113; Y10T 137/7939;
(Continued)

(56) References Cited

U.S. PATENT DOCUMENTS

| 76,992 A | * | 4/1868 | Buzby | F16K 15/063 137/512.3 |
| 123,546 A | * | 2/1872 | Ashton | F16K 15/063 137/536 |

(Continued)

FOREIGN PATENT DOCUMENTS

| DE | 2921465 A1 | * | 1/1981 | |
| JP | 57154565 A | * | 9/1982 | F16K 15/063 |

*Primary Examiner* — Craig J Price
(74) *Attorney, Agent, or Firm* — Daniel S. Polley, P.A.

(57) ABSTRACT

A device and method to improve accuracy of a water meter where a fluid is introduced into a valve assembly having an external casing. The fluid contacts a toggle stopper having a shaft, plate, and guides. A calibrated spring positioned around the shaft in contact with the plate assesses if the desired fluid meets a predetermined pressure. If yes, the calibrated spring compresses thereby toggling the plate within the chamber to allow desired fluid to enter the chamber. If no, the calibrated spring remains in an expanded state to seal the valve assembly. Upon such seal, there is an equalizing of both the desired and undesired fluids to the same pressure by decreasing the volume of the undesired fluid, causing the calibrated spring to compress and reopen.

27 Claims, 6 Drawing Sheets

Related U.S. Application Data continuation of application No. 12/758,126, filed on Apr. 12, 2010, now abandoned, which is a continuation-in-part of application No. 12/383,708, filed on Mar. 27, 2009, now abandoned.

(60) Provisional application No. 61/070,994, filed on Mar. 27, 2008.

(58) Field of Classification Search
CPC ......... Y10T 137/7934; Y10T 137/7933; Y10T 137/7936; Y10T 137/3584
USPC ... 137/15.01, 15.03, 540–543.23, 511–539.5
See application file for complete search history.

(56) References Cited

U.S. PATENT DOCUMENTS

| | | | | |
|---|---|---|---|---|
| 274,767 A * | 3/1883 | Heidel | ............... | B61H 11/02 188/125 |
| 368,489 A * | 8/1887 | Patton | ............... | F22B 9/04 122/115 |
| 373,256 A * | 11/1887 | Traver et al. | ......... | F16L 37/252 251/149.5 |
| 432,140 A * | 7/1890 | Kilborn | ............... | F16K 17/0433 137/469 |
| 917,449 A * | 4/1909 | Jones | ............... | F42B 19/01 114/24 |
| 920,716 A * | 5/1909 | Beckman | ............... | F16K 47/10 137/513.3 |
| 937,773 A * | 10/1909 | Cunning | ............... | F01L 1/32 137/332 |
| 1,076,739 A * | 10/1913 | Biro | ............... | F16T 1/14 137/204 |
| 1,252,940 A * | 1/1918 | Osborne | ............... | F16K 15/063 137/514.5 |
| 1,349,253 A * | 8/1920 | Astrom | ............... | F16K 15/025 137/543.23 |
| 1,360,960 A * | 11/1920 | Kudla | ............... | F16K 17/00 137/516.25 |
| 1,418,096 A * | 5/1922 | Royer | ............... | B25D 9/16 137/517 |
| 1,470,018 A * | 10/1923 | Love | ............... | F16K 15/063 137/542 |
| 1,623,431 A * | 4/1927 | Mcvoy | ............... | F01B 25/00 251/63.4 |
| 1,644,265 A * | 10/1927 | Noble | ............... | F16K 17/10 137/522 |
| 1,767,538 A * | 6/1930 | Mahan | ............... | E21B 21/10 137/515.3 |
| 1,785,271 A * | 12/1930 | Lemex | ............... | E21B 21/10 137/515.5 |
| 1,811,166 A * | 6/1931 | Yardley | ............... | F16K 15/063 137/543.13 |
| 1,828,697 A * | 10/1931 | Yardley | ............... | F16K 15/063 137/543.13 |
| 1,860,004 A * | 5/1932 | Yardley | ............... | F16K 15/063 137/543.13 |
| 1,889,805 A * | 12/1932 | Johnson | ............... | G01F 15/00 137/596 |
| 2,011,547 A * | 8/1935 | Campbell | ............... | F04B 53/1027 137/516.29 |
| 2,178,901 A * | 11/1939 | Webster | ............... | F16K 17/04 73/1.72 |
| 2,591,060 A * | 4/1952 | Garretson | ............... | F16K 17/30 137/513.3 |
| 2,594,641 A * | 4/1952 | Griffith | ............... | F16K 15/063 137/543 |
| 2,744,727 A * | 5/1956 | Osburn | ............... | E21B 21/10 137/454.2 |
| 2,814,200 A * | 11/1957 | Hills | ............... | G01F 15/007 73/200 |
| 2,822,817 A * | 2/1958 | Benzel | ............... | F16K 15/063 137/223 |
| 2,886,054 A * | 5/1959 | Smith | ............... | F16K 15/063 137/316 |
| 2,917,077 A * | 12/1959 | Ziege | ............... | F16K 47/023 137/514.7 |
| 2,931,385 A * | 4/1960 | Carlisle | ............... | E21B 43/123 137/516.29 |
| 2,960,998 A * | 11/1960 | Sinker | ............... | F16K 15/063 137/542 |
| 3,053,500 A * | 9/1962 | Atkinson | ............... | F04B 53/1025 251/332 |
| 3,286,722 A * | 11/1966 | Royer | ............... | F16K 24/06 137/218 |
| 3,299,704 A * | 1/1967 | Wilson | ............... | B67D 7/763 73/200 |
| 3,565,100 A * | 2/1971 | Pfleger | ............... | F16K 15/026 137/269.5 |
| 3,754,568 A * | 8/1973 | Gallagher | ............... | F16K 15/026 137/516.29 |
| 3,875,884 A * | 4/1975 | Zundel | ............... | B65D 17/4011 413/12 |
| 3,918,418 A * | 11/1975 | Horn | ............... | F02B 77/04 123/41.08 |
| 3,937,249 A * | 2/1976 | Suey | ............... | F16K 15/063 137/543.13 |
| 3,995,658 A * | 12/1976 | Hager | ............... | F16K 15/063 137/543 |
| 4,203,466 A * | 5/1980 | Hager | ............... | F16J 15/062 137/543 |
| 4,257,452 A * | 3/1981 | Hill | ............... | F16K 17/30 137/514.7 |
| 4,271,862 A * | 6/1981 | Snoek | ............... | F16K 1/34 137/511 |
| 4,350,179 A * | 9/1982 | Bunn | ............... | F04B 39/1053 137/246.12 |
| 4,453,561 A * | 6/1984 | Sands | ............... | F16K 15/063 137/218 |
| 4,523,607 A * | 6/1985 | Daghe | ............... | E03C 1/106 137/218 |
| 4,535,808 A * | 8/1985 | Johanson | ............... | F16K 15/063 137/533.21 |
| 4,638,832 A * | 1/1987 | Mokveld | ............... | F16K 1/126 137/220 |
| 4,648,369 A * | 3/1987 | Wannenwetsch | .... | F02M 59/462 123/467 |
| 4,691,727 A * | 9/1987 | Zorb | ............... | G01F 15/18 137/15.03 |
| 4,747,426 A * | 5/1988 | Weevers | ............... | F16K 15/063 137/220 |
| 4,830,046 A * | 5/1989 | Holt | ............... | F16K 17/30 137/460 |
| 4,953,589 A * | 9/1990 | Nakamura | ............... | F02M 59/462 137/543.23 |
| 5,088,521 A * | 2/1992 | Johnson | ............... | E21B 21/01 137/516.29 |
| 5,113,900 A * | 5/1992 | Gilbert | ............... | F16K 15/063 137/515.5 |
| 5,161,572 A * | 11/1992 | Oberl | ............... | F01M 1/16 137/516.27 |
| 5,293,898 A * | 3/1994 | Masloff | ............... | F16K 17/30 137/517 |
| 5,439,984 A * | 8/1995 | Kodama | ............... | B29C 59/14 525/332.8 |
| 5,482,080 A * | 1/1996 | Bergmann | ............... | F16K 15/063 137/543.13 |
| 5,918,619 A * | 7/1999 | Woods | ............... | F16K 17/0413 137/15.19 |
| 5,967,181 A * | 10/1999 | Momont | ............... | G05D 16/103 119/72 |
| 5,988,705 A * | 11/1999 | Norkey | ............... | F16L 37/0987 137/614.05 |
| 6,019,115 A * | 2/2000 | Sanders | ............... | F16K 17/30 137/10 |
| 6,152,171 A * | 11/2000 | Messick | ............... | F16K 15/063 137/515.7 |
| 6,397,884 B1 * | 6/2002 | Miyajima | ............... | F02M 25/0872 137/543.23 |

(56) References Cited

U.S. PATENT DOCUMENTS

| | | | | |
|---|---|---|---|---|
| 6,532,764 B1* | 3/2003 | Hirota | ..................... | F25B 41/31 |
| | | | | 62/527 |
| 6,837,267 B2* | 1/2005 | Weis | ..................... | F16K 15/063 |
| | | | | 137/269 |
| 7,143,784 B2* | 12/2006 | Fangmeier | ........... | F16K 15/063 |
| | | | | 137/542 |
| 8,205,630 B2* | 6/2012 | McKee | .................. | B25B 27/24 |
| | | | | 137/15.18 |
| 8,230,875 B2* | 7/2012 | Norman | .............. | F16K 27/0209 |
| | | | | 137/315.33 |
| 8,707,981 B2* | 4/2014 | Edgeworth | ........... | F16K 15/063 |
| | | | | 137/270 |
| 8,726,932 B2* | 5/2014 | Matsubara | ............ | F16K 15/026 |
| | | | | 137/515.5 |
| 8,985,390 B2* | 3/2015 | Altonen | ................ | G01F 11/286 |
| | | | | 222/1 |
| 8,991,430 B2* | 3/2015 | Huang | ................ | F16K 27/0209 |
| | | | | 137/843 |
| 9,200,717 B2* | 12/2015 | Martin | ................ | F16K 27/0209 |
| 9,315,977 B1* | 4/2016 | Gass | ....................... | E03C 1/106 |
| 9,404,244 B1* | 8/2016 | Gass | ..................... | F16K 15/063 |
| 9,644,356 B1* | 5/2017 | Gass | ..................... | F16K 15/025 |
| 9,683,354 B2* | 6/2017 | Gass | ..................... | G01F 15/005 |
| 9,777,850 B1* | 10/2017 | Handley | .............. | F16K 27/0209 |
| 10,073,071 B2* | 9/2018 | Deng | ..................... | F23D 17/00 |
| 10,125,476 B1* | 11/2018 | Handley | .............. | F16K 15/063 |
| 2003/0098074 A1* | 5/2003 | Kayahara | ............ | F16K 31/0693 |
| | | | | 137/557 |
| 2004/0045607 A1* | 3/2004 | Lammers | .............. | F16K 15/063 |
| | | | | 137/543 |
| 2004/0060599 A1* | 4/2004 | Miyajima | ............ | F16K 17/082 |
| | | | | 137/515 |
| 2005/0268969 A1* | 12/2005 | Zakai | .................... | G01F 15/028 |
| | | | | 137/540 |
| 2006/0185739 A1* | 8/2006 | Niki | ....................... | F16L 37/40 |
| | | | | 137/543.23 |
| 2007/0277887 A1* | 12/2007 | Imler | .................... | F16L 55/1007 |
| | | | | 137/614.04 |
| 2016/0033051 A1* | 2/2016 | Barbato | .................. | F16K 17/30 |
| | | | | 137/498 |
| 2018/0329435 A1* | 11/2018 | Chalfin | ..................... | F16K 1/42 |

\* cited by examiner

ACCURACY ENHANCING VALVE ASSEMBLY AND METHOD

This application is a continuation of U.S. application Ser. No. 15/899,119, filed Feb. 19, 2018, which is a continuation of U.S. application Ser. No. 12/758,126, filed Apr. 12, 2010, which is a continuation-in-part of U.S. application Ser. No. 12/383,708, filed Mar. 27, 2009, which claims the benefit of U.S. Provisional Application No. 61/070,994, filed Mar. 27, 2008, all of the above-identified applications are hereby incorporated by reference herein in their entireties for all purposes.

FIELD OF THE INVENTION

This invention is directed towards a valve assembly inter-disposed within a desired fluid to enhance accuracy of a meter, positioned proximate to the valve assembly, for purposes of measuring the volume of that desired fluid. More specifically, the invention is directed toward a valve assembly that employs pressure differentials between the desired fluid and an undesired fluid—to ensure an accurate reading of only the volume of desired fluid.

BACKGROUND OF THE INVENTION

One of the hallmarks of industrialized society is the ability to move large quantities of liquid from a centralized source to a second location—often traversing large distances and complex geography. One example is municipal transport of treated, purified and potable water from a centralized facility to individual residents for consumption. A second example is transporting low temperature liquid natural gas (LNG) from centralized containers to commercial facilities to provide energy. Yet a third example is moving crude oil through various pipelines in remote and desolate areas to coastal ports for transport via tanker for refining into petroleum.

In each of the aforementioned examples, it becomes crucial to accurately measure the volumetric quantity of fluid flowing through these various conduits, tubes and pipelines. This is because the volume transported and ultimately received by the consumer directly correlates to the price charged for the fluid. In most cases, this volume is gauged through a meter placed within the stream of the passing fluid—rather than measuring an end-filled reservoir.

As previously discussed, access to a municipal water supply represents one of the most important examples of transport of large quantities of fluid (here, water) from a centralized source to various end users. Current statistics suggest that over three and one-half billion people throughout the world have access to a centralized water supply for domestic and commercial use. This water supply is accomplished through a series of conduits, pipes and fittings. In most cases, the centralized facility—usually a public utility—controls the supply, delivery, purification and processing of the water being delivered. Often, this water is delivered to these end users with a specific level of pressure to provide a sufficient flow rate for use in a variety of different applications. Typically, the specific water pressure delivered by most centralized municipal water generally ranges from 30 to 85 psi.

Measuring and gauging the actual amount of water consumed from a municipal water authority by a residence currently is unfortunately more of an art than science. Most public utilities position individual water meters at each residential and commercial facility that draw from the centralized offerings of potable water. These water meters are measured each month either manually—or more recently through automated systems—to bill each consumer for water drawn and used from the municipal water authority. Accordingly, most measurement of water drawn by end users occurs generally at the point of delivery of the fluid.

Despite advances in civil engineering, which include pre-fabricated conduits for transport of treated water, there exist several drawbacks that impede the accurate measurement of water drawn by consumers. Many of these drawbacks are due to air being introduced within the various conduits that form the water supply lines. The quantity of this air varies from small air bubbles caused by cracks, holes or breaches within the conduits, to larger air pockets resulting during repair and/or maintenance of the water supply lines. In addition, damage to the water supply lines, often caused by natural disaster, accident or similar event can also trigger introduction of quantities of air.

Regardless of the cause, these air bubbles or air pockets will travel along the path of water flow within the water supply lines and will ultimately be delivered to the residential or commercial facility. As a result, the introduction of this air into the water supply line will be measured by the water meter and charged to the corresponding facility as drawn/used water. This is due to the fact that most, if not all, conventional water meters are not structured to distinguish between air flow and water flow passing therethrough. Put another way, a water meter would read (and correspondingly bill) passage of five liters of water and one liter of air as six liters of water. As a result, accidents or degrading of municipal water supply lines—the root of which is ultimately the responsibility of the public utility—will lead to introduction of air, higher meter readings and unfortunately higher billings to the end user.

Another factor that further complicates this issue is that most municipalities (or in the alternative states) have enacted ordinances or other laws, which prohibit tampering or altering convention water meters. As such, end users cannot place any type of venting device to remove trapped air within the water supply line just prior to the water meter—without violating some form of local law. This is particularly frustrating as it is the underlying municipality that is often the cause of this air within the water supply lines—a predicament that is ultimately paid for by the consumer.

Accordingly, there is a need in the art of water distribution for an appropriate way to eliminate the charging of under users/consumers of public utilities for the passage of air through a water meter prior to being drawn into a domestic or commercial facility. Put another way, there is a need for an effective device—placed subsequent to the water meter but prior to the underlying facility—that will reduce a conventional water meter from charging for air passing through the water supply. Moreover, such device should be robust, simply designed and which functions to enhance rather than alter the functionality of the water meter. Such a device should not solely be used for improving the accuracy of water meter readings, but could also be used to properly measure other fluid flows such as liquid natural gas, crude oil and/or petroleum passing through a conduit.

SUMMARY OF THE INVENTION

The current invention helps improve the accuracy of a meter employed to measure the volume of a desired fluid. The invention is directed to a valve assembly which helps ensure that certain undesirable fluids—such as trapped air or trace gasses—are not measured by a conventional meter. This valve assembly may be comprised of both an external casing and internal components. The external casing has an inlet, a corresponding outlet, an exterior side and a corresponding interior side. This interior side may include a first chamber, a second chamber and a wall inter-disposed between both chambers. The second chamber has an interior diameter that is larger than the first chamber. Moreover, the first chamber is located proximate the inlet while the second chamber is located proximate the outlet.

The internal components of the valve assembly may include a toggle stopper having an exterior diameter proximate to the interior diameter of the second chamber of the external casing. Moreover, the toggle stopper may include a shaft, a plate having a first side and corresponding second side and one or more guides. Positioned around the shaft is a calibrated spring capable of exerting force on the first side of the plate. The shaft is affixed perpendicular to the first side of the plate.

The toggle stopper may include three guides affixed perpendicular to the second side of the plate. These guides are oriented to create a shape and size sufficient to conform to the external diameter of the first chamber. In addition, the guides are of a sufficient size and dimension to fit within the internal diameter of the first chamber. Positioned proximate to the wall is an o-ring capable of effectuating a seal with the second side of the plate.

The invention is further directed to a method for improving accuracy of a meter employed to measure a desired fluid—such as pressurized water emanating from a centralized facility for use by an end user (such as a residential or commercial facility). The method may first comprises the step of introducing the desired fluid into a valve assembly having an external casing which includes an inlet, a corresponding outlet, an exterior side and a corresponding interior side forming one or more chambers. The method may next contemplate contacting the desired fluid with a second side of a plate positioned within the exterior casing. Here, the plate is part of a toggle stopper also having a shaft and one or more guides.

The third step may assess if the desired fluid is at or greater than a predetermined pressure through use of a calibrated spring positioned around the shaft of the toggle stopper. This calibrated spring is in contact with and capable of exerting force on a first side of the plate. In the case of pressurized water, this predetermined pressure is between 20 to 120 psi, by way of example. If the desired fluid meets or exceeds this predetermined pressure, the force of the desired fluid compresses the calibrated spring resulting in toggling the plate within the chamber and allowing the desired fluid to flow through chamber to exit the outlet.

However, should the total pressure of the desired fluid and/or an undesired fluid create a pressure that fails to meet the predetermined pressure (such as trapped air having a lower pressure of 10 to 30 psi), the method contemplates expanding the calibrated spring so as to position the plate in proximity of the inlet to seal the valve assembly and prevent both the desired fluid and undesired fluid from entering. Upon creating this seal, the final step of the method contemplates equalizing both the undesired fluid and desired fluid to essentially the same pressure by decreasing the volume of the undesired fluid in order to reach the predetermined pressure to allow the calibrated spring to compress and re-open the valve assembly to resume flow.

BRIEF DESCRIPTION OF THE DRAWINGS

For a fuller understanding of the invention, reference is made to the following detailed description, taken in connection with the accompanying drawings illustrating various embodiments of the present invention, in which.

DETAILED DESCRIPTION OF THE INVENTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Overall Functionality and Application

Figure 1:
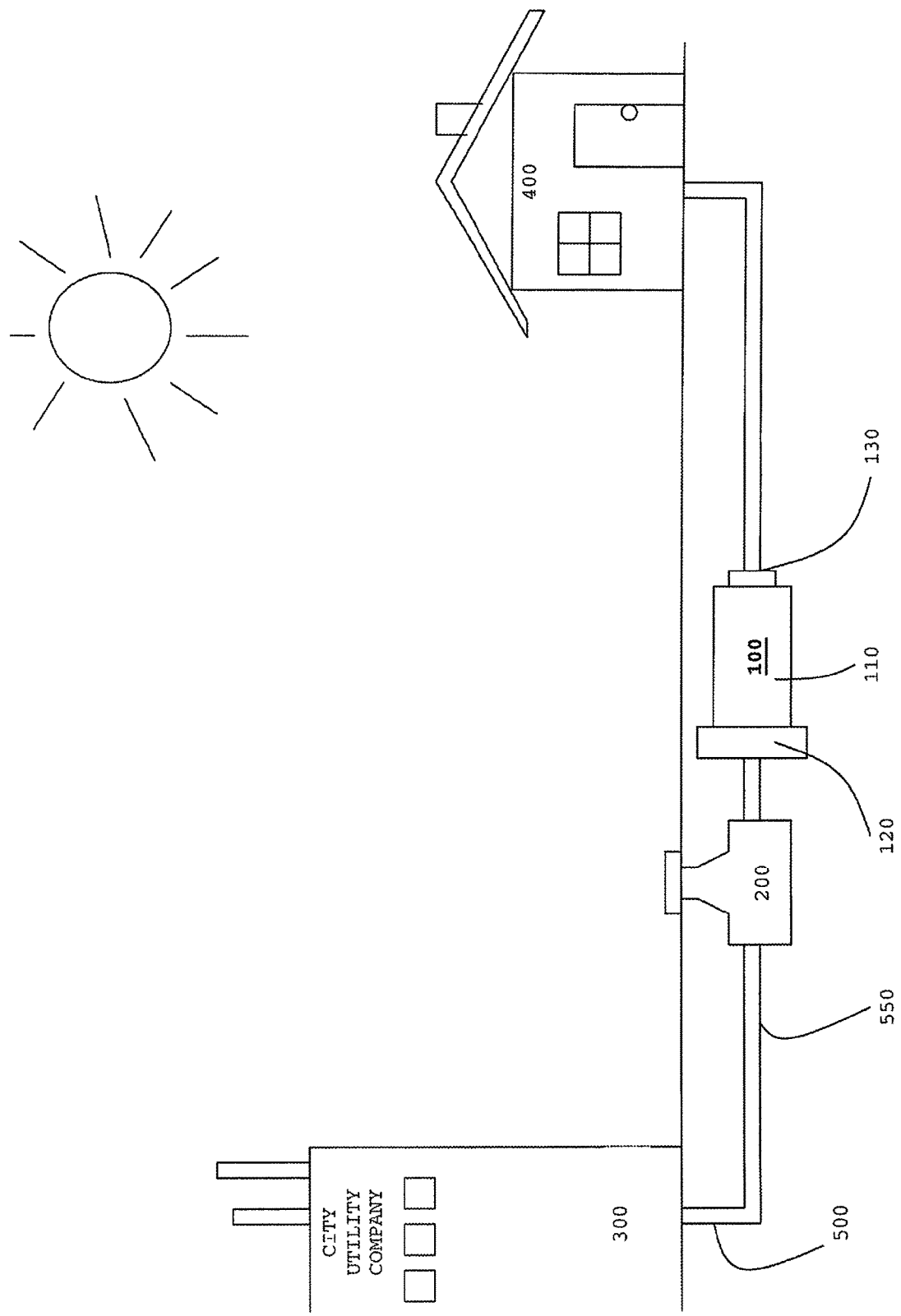
FIG. 1 is an elevation view illustrating one preferred placement of the valve assembly in light of the meter.

FIG. 1, by way of example, offers one example of the functionality and placement of the apparatus contemplated by the invention. As shown, the invention is generally directed to a valve assembly 100 in direct communication and placed in proximity to a meter 200. A central facility 300 provides a desired fluid 500 to the meter 200, which in turn feeds the desired fluid 500 into the valve assembly 100. The desired fluid 500 ultimately exits the valve assembly 100 for use by an end user 400—which here is either a residential, commercial or other facility.

While the valve assembly 100 can function through placement upstream (prior to the fluid being measured) or downstream (after the fluid is measured), it is typically placed downstream and subsequent to a meter 200. More specifically, the valve assembly 100 is placed not more than twelve inches downstream from the meter 200. This placement is specifically contemplated to avoid violation of any protocols, agreements, laws or ordinances.

As discussed in greater detail below, the valve assembly 100 helps increase the accuracy of how the meter 200 reads the desired fluid 500—which can be either gaseous or liquid. In most applications of the valve assembly 100, there exists an undesirable fluid 550 inter-dispersed within the desired fluid 500. Usually, the undesired fluid 550 is introduced to the desired fluid 500 somewhere between the central facility 300 and the meter 200. The purpose and function of the valve assembly 100 is to ensure proper measurement of this desired fluid 500, without need to measure, pay for and/or denote existence of the second undesired fluid 550. One important benefit of the valve assembly 100 is that it helps increase such efficiency without need to off-gas, remove or separate the desired fluid 500 from the second undesired fluid 550.

Numerous applications of the valve assembly 100 illustrated in FIG. 1 exists. However, in the description of the embodiments contained here, it is assumed purified and potable water is the desired fluid 500 while air or other trapped gasses represent the second undesired fluid 550. Here, this pressurized water 500 is fed into valve assembly 100 at approximately 60 psi. Examples of the functionality of this valve assembly 100 described herein are also based upon use within a public utility, operated by a municipal authority, to deliver purified and potable water from a centralized source 300 to an end user 400—which is then metered to bill/charge that end user 400. However, other applications to more accurately measure and charge for liquid natural gas (LNG) and crude oil/petroleum are also contemplated by the invention.

Exterior of the Apparatus

Figure 2:
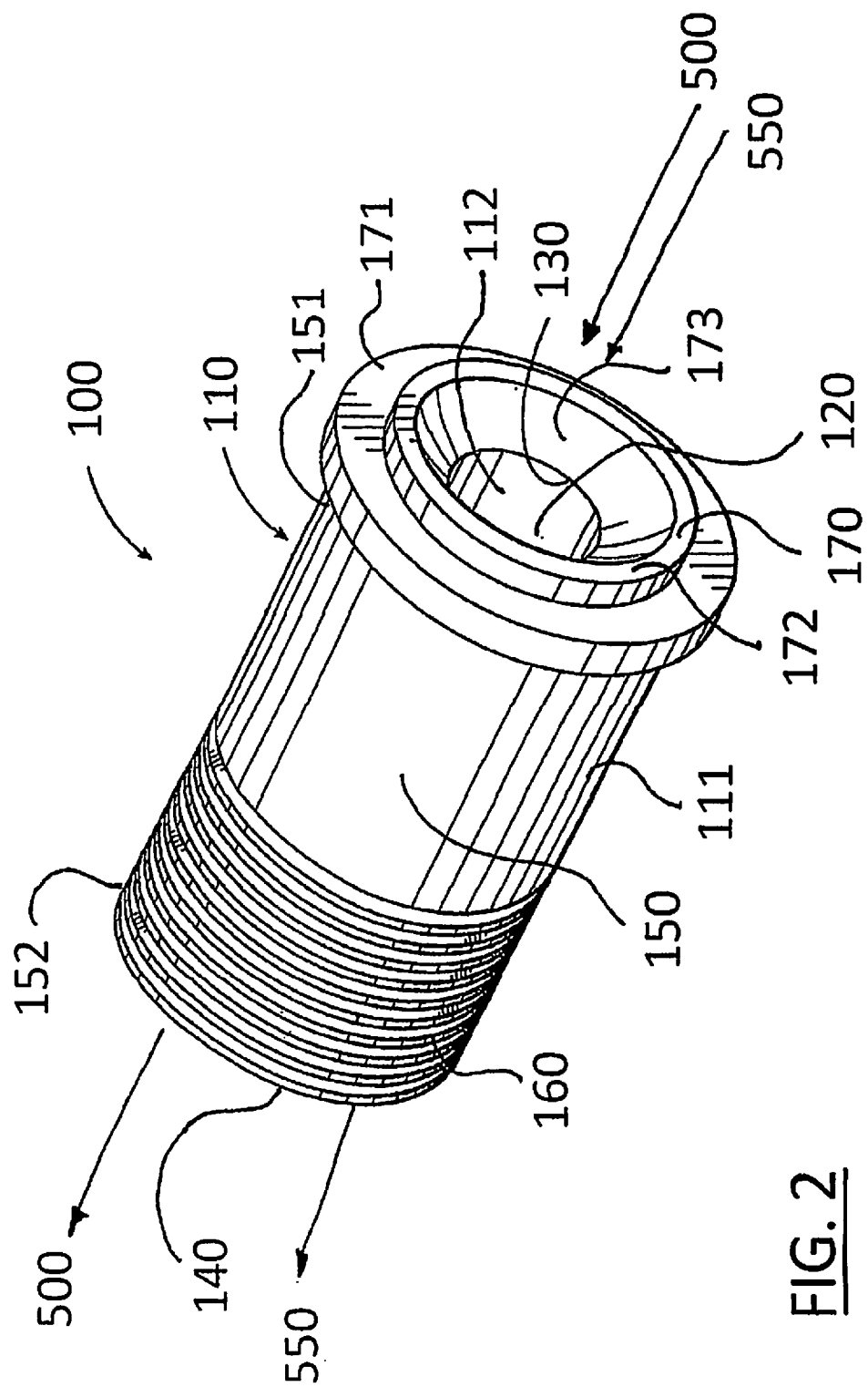
FIG. 2 is a perspective view of the outer casing of the valve assembly.
Figure 3:
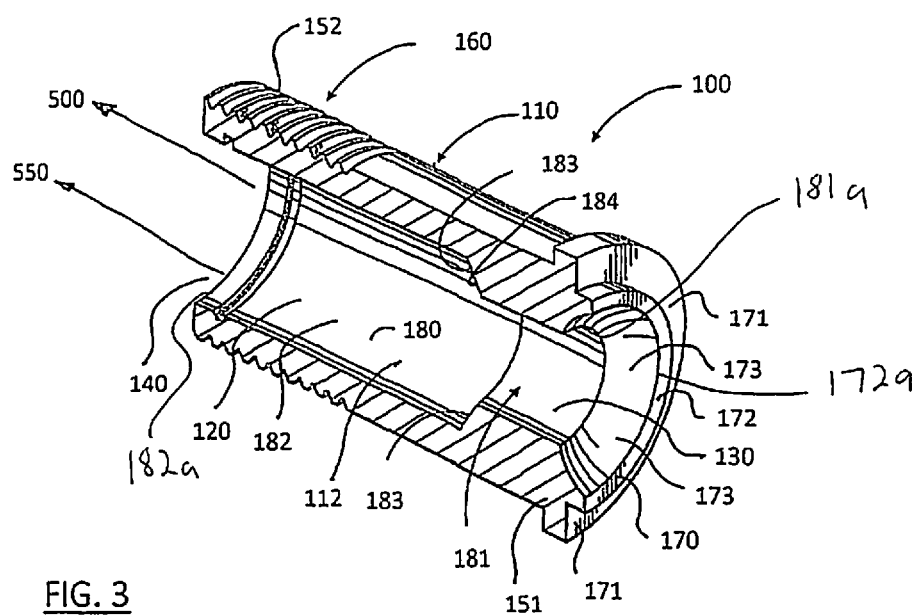
FIG. 3 is a cut-away perspective view of the inside of the outer casing of the valve assembly.
Figure 4:
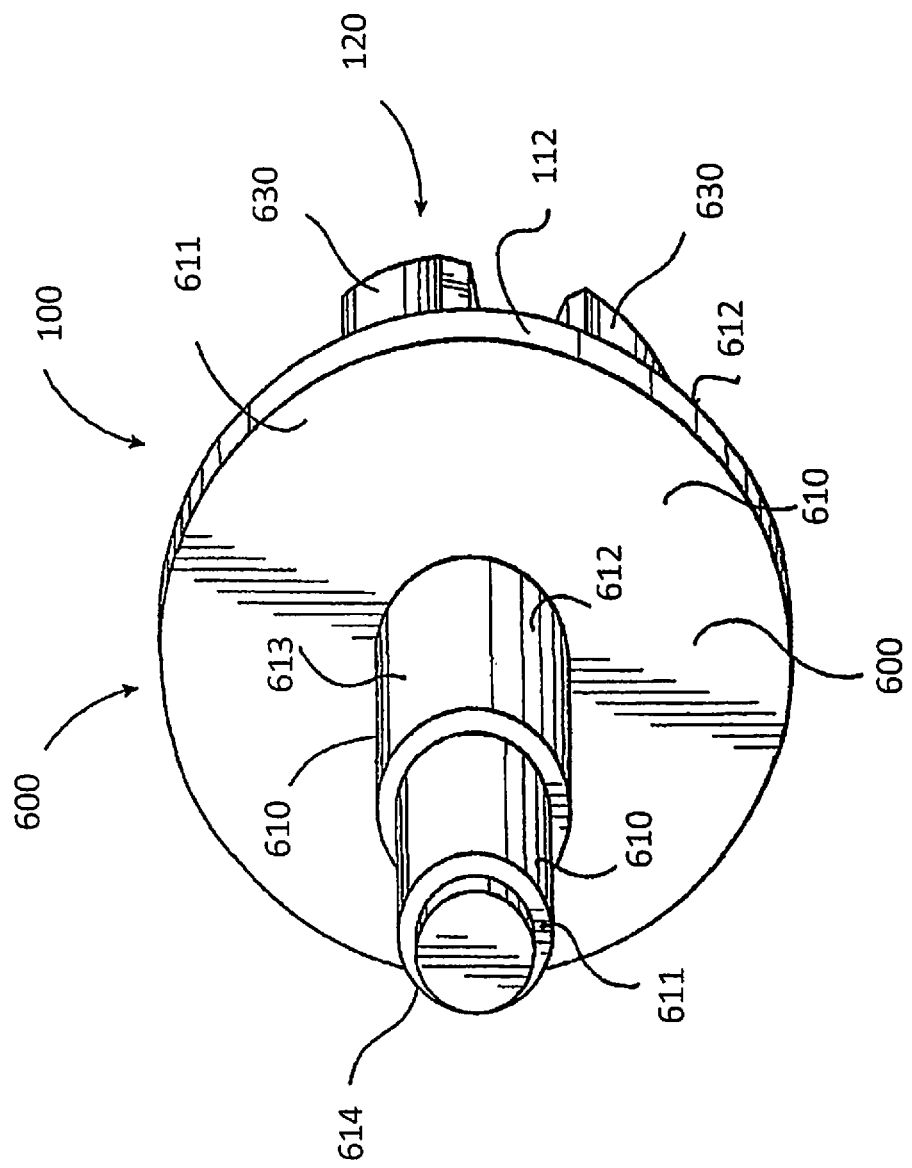
FIG. 4 is a perspective view of the toggle stopper of the valve assembly.

FIGS. 2 through 4 illustrate the various components of the valve assembly 100, which may include an exterior casing 110 and various internal components 120. First turning to FIG. 2, the external casing 110 is essentially cylindrical in shape and orientation, having an inlet 130 and a corresponding outlet 140. As shown in FIG. 3 (described in greater detail below), the external casing 110 has both an exterior side 111 and a corresponding interior side 112. The surface area of the exterior side 111 forms the sheath 150 illustrated with reference again to FIG. 2. The sheath 150 includes a first end 151 and a corresponding second end 152. The first end 151 is positioned proximate to the inlet 130 while the second end 152 is positioned proximate to the outlet 140. Combination of the inlet 130, outlet 140 and interior side 112 of the sheath 150 create a passageway that allows in-line communication with the meter 200 to maintain sufficient pressure and flow rate of the desired fluid 500 (pressurized water).

As further shown in FIG. 2, the sheath 150 can include threads 160 of a sufficient size and dimension so as to engage and attach to a tube, pipe or similar conduit in which the water is flowing. More specifically, the threads 160 should be positioned at the portion of the external casing 110 where the out take pipe—which ultimately feeds to end user (either a residential or commercial facility)—would be affixed. These threads 160 are preferably positioned near the second end 152 of the sheath 150 located near the outlet 140.

Positioned at the first end 151 of the sheath 150 is a connector 170. The connector 170 connects an incoming pipe to the valve assembly 100. As shown in FIG. 2, the connector 170 may include an outer flange 171, an intermediary lip 172 and a curved coupler 173. These three portions 171-173 of the connector help feed the pressurized water 550 to be treated within the valve assembly 100. Alternatively, the connector 170 can just be a flange 171, a threaded portion, or a conned shape of sufficient size and dimension to fit into the conduit or pipe. FIG. 3 illustrates the interior side 112 of the exterior casing 110. The various portions of the interior side 112 form an interior chamber 180 in which pressurized water 500 flows. As further shown in FIG. 3, the valve assembly 100 preferably includes a first chamber 181 and a second chamber 182. Both the first and second chambers 181 and 182 are in direct communication with one another. The first chamber 181 has a smaller diameter than the second chamber 182. Accordingly, there is a step or wall 183 formed at the connecting point 184 of both chambers 181 and 182. As also seen in FIG. 3, the second internal chamber 182 has a diameter 182a and the first internal chamber 181 has a diameter 181a. The size of the diameter 182a of the second internal chamber 182 is seen as being larger than the size of the diameter 181a of the first internal chamber 181. Additionally, the lip member 172/173 is also seen as having an opening with a diameter 172a that is also larger in size than the diameter 181a of the first internal chamber 181.

The external casing 110 can be preferably of uni-body construction and manufactured out of a hard, resilient, water tight, air tight and corrosive-resistant material. Examples of such material include, but are certainly not limited to, metal, polymer, composite, or ceramic. Other similar materials will be recognized and understood by those of ordinary skill in the art.

However, lead-free brass or ABS plastic are the most common contemplated material for the external casing 110.

Interior of the Apparatus

Figure 5:
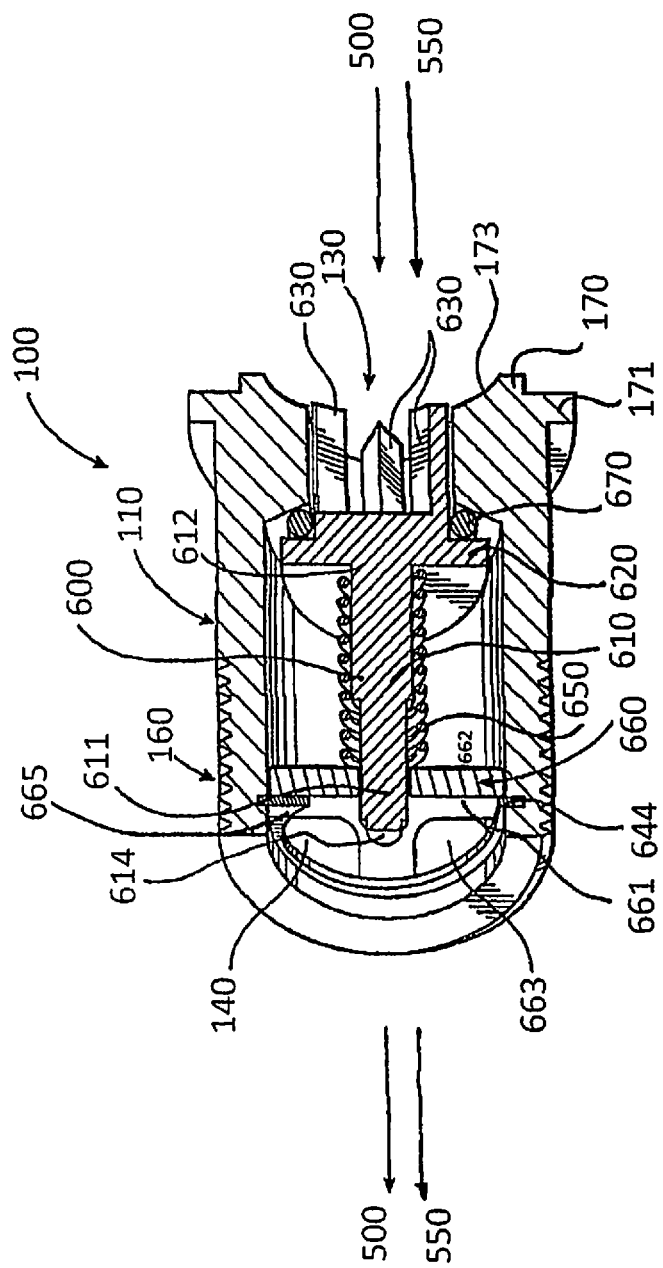
FIG. 5 is a cut-away perspective view of internal components of the valve assembly.
Figure 6:
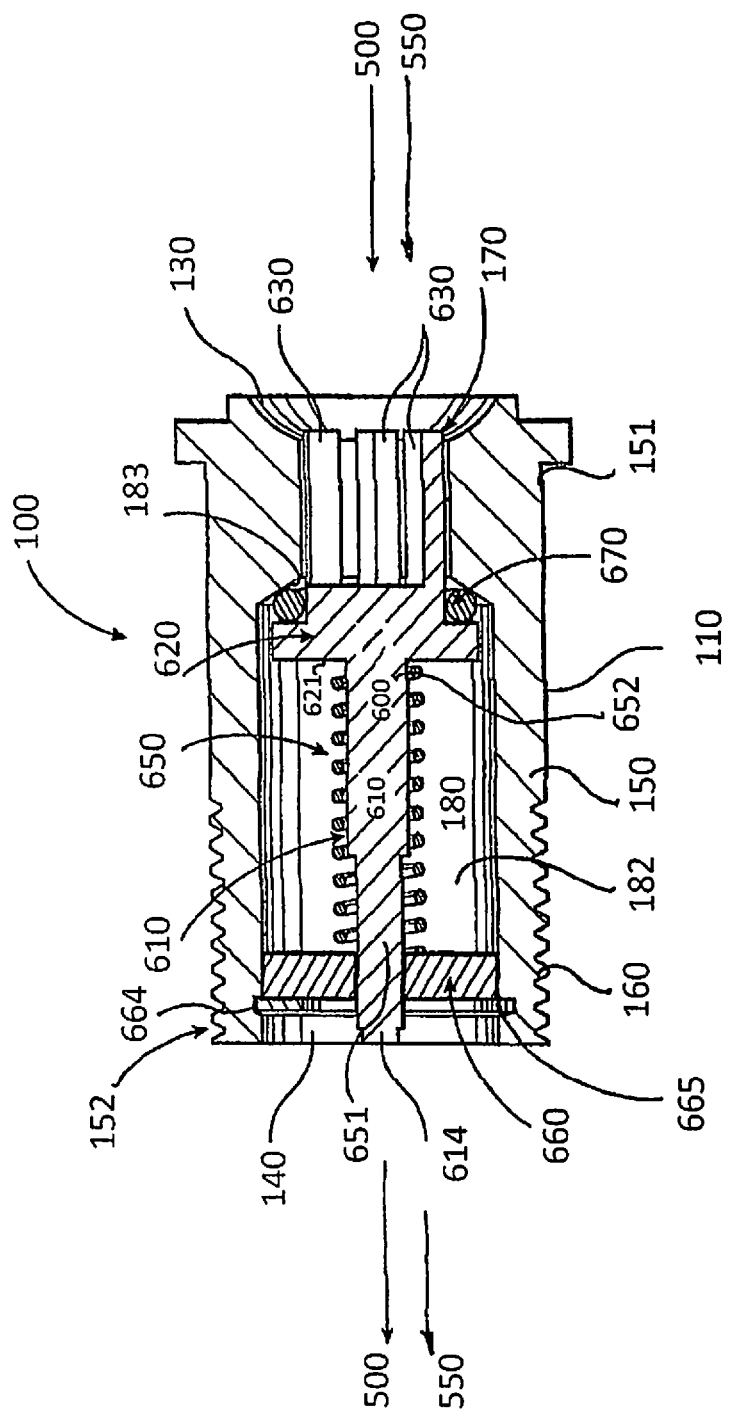
FIG. 6 is a cut-away direct view of the valve assembly in a closed position.

FIGS. 4 through 6 illustrate the various internal components 120 of the valve assembly 100. The internal components 120 include, but are not necessarily limited to, a toggle stopper 600, a calibrated spring 650 which fits around the toggle stopper 600, a perforated positioning wall 660, and an o-ring 670 as illustrated with reference to both FIGS. 5 and 6. Other related or additional internal components 120 will be recognized and understood by those of ordinary skill in the art.

FIGS. 4 and 5 both illustrate, by way of example, one embodiment of a toggle stopper 600. The toggle stopper 600 includes a shaft 610, a plate 620 and a plurality of guides 630. The shaft 610 includes a first portion 611, a corresponding second portion 612 and a cylindrical surface 613. The plate 620 is affixed to the second portion 612 of the shaft 610. Correspondingly, the first portion 611 may include a tip 614 having a sufficient size and dimension to be positioned and rest within the perforated positioning wall 660.

The plate 620 is positioned essentially perpendicular with the shaft 610. The outer diameter of the plate 620 corresponds to the internal diameter of the second chamber 182 of the exterior casing 110. As further shown in FIG. 5, the plate 620 is essentially flat having a first side 611a and a corresponding second side 612a. Positioned between the wall 183 and second side 612a of the plate 620 is an o-ring 670. The o-ring 670 helps effectuate a water-tight seal to prevent pressurized water 500 from entering the second chamber 182 when the valve assembly 100 is in a closed position.

As further shown in FIG. 5, there can be a plurality of guides 630 affixed to the second side 612a of the plate 620. Each of the guides is essentially perpendicular to the plate 630 and are oriented and positioned to form the shape of a circle. There are preferably three more guides 630 to form such a circle. This circle of guides 630 functions to direct the toggle stopper 600 into the first chamber 181 to effectuate a seal with the internal components 120. The seal is caused by the o-ring 670 contacting both the second side 612a of the toggle stopper 600 and the wall 183, which results in closing the valve assembly 100 to prevent pressurized water 500 from entering the apparatus.

FIG. 5 further illustrates the functionality and structure of the perforated positioning member 660. As shown, the positioning member 660 is essentially a flat disk having a first side 661, a corresponding second side 662 and one or more flow-through perforations 662. These flow-through perforations 662 allow pressurized water 500 to leave the valve assembly 100 for use by the end user 400. Positioned in the middle of the positioning member 660 is an opening 663. The opening 663 is of a sufficient size and dimension to allow the tip 614 of the first portion 611 of the shaft 610 to slide and toggle back and forth. Moreover, the opening 663 provides overall stability and support for the toggle stopper 600 (in addition to how the guides 630 are positioned within the first chamber 181).

FIG. 6 illustrates how the positioning member 660 is secured to the outer casing 110 of the valve assembly 110. As shown, one way to affix the positioning member 660 is through a recess 664 positioned near the outlet 140. A securing ring 665 can be placed and fitted within the recess 664. The securing ring 665 provides a fixed surface in which the first side 661 of the positioning member 660 can rest. Alternatively, the positioning member 660 can simply be pressed, glued or welded onto the first chamber 181 of the outer casing 110.

FIG. 6 also shows the positioning and location of the calibrated spring 650. The calibrated spring 650 fits around the shaft 610 of the toggle stopper 600 and includes a first portion 651 and corresponding second portion 652. The first portion 651 rests on the second side 662 of the positioning member 660. Correspondingly, the second portion 652 of the calibrated spring 650 can rest upon the first side 621 of the plate 620.

For the embodiment herein described in greater detail below by way of example, the calibrated spring 650 is designed to compress (and accordingly open) when there is between 20 and 120 psi of pressurized water 500. However, if there is a sufficient amount of undesired fluid 550 (i.e., trapped air and trace gasses) present at lower pressure, the calibrated spring 650 will expand and cause the toggle stopper 600 to close. Moreover, the calibrated spring 650 can be adjusted based upon the nature of the pressure differential desired—which is based upon the likely total pressure of both the desired and undesired fluids contemplated to pass through the valve assembly 100 while desired fluid (here water) is being drawn from the centralized source to the end user.

The external casing or housing can have an internal groove disposed near its outlet. The external casing/housing can house a securing member and a positioning member. The securing member can have an outer end that is fully disposed within the internal groove of the external casing/ housing. The positioning member can have one or more openings to allow fluid flow and the positioning member can act as a stop member for one end of the spring. The internal diameter of the second chamber beginning from an outlet end of the external casing and running to a closest end of the internal wall can be virtually a same diameter throughout excluding the internal groove near the outlet end;

Preferred Method

Apart from an apparatus, the invention is further directed to a method to improve the accuracy of a meter 200 through use of a valve assembly 100. The method contemplates that the valve assembly 100 is in-line with both a first conduit and corresponding second conduit. More specifically, the method contemplates that pressurized water 500 is measured by the meter 200 and then transported through the first conduit into the inlet 130. After employing the valve assembly 100, this pressurized water 500 then flows out of the outlet 140 and into the second conduit.

The primary goal of the method is to increase accuracy of the true amount of volume of pressurized water 500 (or any desired fluid) is measured by the meter 200. As previously discussed, upon leaving a centralized facility 300, various undesired fluids 550 can be introduced into the pressurized water 500. This included, but is certainly not limited to, air and other trace gasses. Causes of this introduction of unde-sired fluid 550 can include, without limitation, breaches in the line, construction and normal wear and tear on traditional municipal water systems.

When measuring pressured water 500, conventional meters 200 essentially measure these undesired fluids 500 as pressurized water 500—thus leading to an inaccurate reading. The result is larger bills for the end user 200, because the meter 200 registers the same regardless of whether pressurized water 500 or undesired fluid 550 passes through the meter 200.

The contemplated method helps improve the accuracy of the meter 200 to ensure it provides a more true reading of the actual volume of pressurized water 500 that passes through the meter 200. This method takes advantage of the natural properties of incompressible liquids in comparison to more compressible gases—such as air. More specifically, most centralized water authorities (i.e., centralized facilities 300) provide pressurized water at between 30 and 85 psi. In comparison, most trapped undesirable fluids 550 exist at between 0 to 15 psi. The method employs this pressure differential in aiding accuracy of the meter 200.

The first step of the method is to determine whether pressurized water 500 is entering the inlet 130 at or greater than a predetermined pressure. Such determination is made based upon the calibrated spring 650, shown in FIG. 6, which is part of the internal components 120 of the valve assembly 100. As illustrated, the calibrated spring 650 fits around the shaft 610 of the toggle stopper 600 and is secured tightly between the positioning member 660 and the first side 621 of the plate 620.

The calibrated spring 650 is designed to flex when there is at least 20 psi of force exerted on the second side 622 of the plate 620. If such pressure indeed exists, the calibrated spring 650 compresses. Accordingly, the toggle stopper 600 internally pivots based upon the force of the pressurized water 500 as it enters from the inlet 130 into the first chamber 181. Moreover, this desired fluid 500 flows around the plate 620, into the second chamber 182 and then exits the valve assembly 110 through the outlet 140.

The method next contemplates expanding the calibrated spring 650 and closing the toggle stopper 620 if there is a total pressure drop between both the desired fluid 500 and the undesired fluid 550 evidencing a significant amount of lower pressure undesirable fluid 550—such as air or other trace gases. When such pressure drop occurs, the calibrated spring 650 will expand and thus create force upon the first side 621 of the plate 620. This will in turn cause the toggle stopper 600 to pivot back and rest upon the wall 183— creating a seal between the second side 622 of the plate 620 and the o-ring 670. The plate 620 is properly positioned on the o-ring 670 through assistance of the guides 630 as they slide and become positioned within the first chamber 181. The result is the valve assembly 100 entering a closed position.

Once the valve assembly 100 is in a closed position, undesirable fluid 550 becomes squeezed before the meter 200 and the valve assembly 100 within the first conduit. Pressurized water 500, exiting the meter 200 at between 20 to 120 psi, naturally exerts force on trapped undesirable fluid 550. This pressure differential results in the decreasing the volume of this undesirable fluid 500, which in turn causes its pressure to increase. At some point, the pressure of the undesirable fluid 550 will equalize with the pressurized water 500. Such equalizing will cause the calibrated spring 500 to open the toggle stopper 600 to allow both fluids to enter the valve assembly 100—this placing it in an open position.

When the valve assembly 100 is placed in a closed position—in order to equalize the undesirable fluid 550 to that of the pressurized water 500—there exists a deceleration of the meter 200. Based upon the quick transition from the open position to the closed position of the valve assembly 100, the flow rate is quickly reduced. However, based upon the function of the valve assembly 100 to reduce the volume of the undesirable fluid 550, the result is the seeping of a finite amount of pressurized water 500 through the meter.

This seeping of pressurized water 500 is roughly the same or somewhat less than the volume of the undesirable fluid 500 which passed through and was read by the meter 500. However, based upon the acceleration differential, this seeping of pressurized water 500 through the meter 200 at a lower velocity in comparison to normal flow, is not read by the meter 200. Because the volume of seeped pressurized water 500 is equal or slightly less than the volume of undesirable fluid 550, the result is a more accurate reading of the true volume of pressurized water 500 that flows through the meter 200 for use by the end user 400.

All measurements, dimensions, shapes, amounts, angles, values, percentages, materials, degrees, product configuration, orientations, product layout, component locations, sizes, number of sections, number of components or items, etc. discussed above or shown in the Figures are merely by way of example and are not considered limiting and other measurements, dimensions, shapes, amounts, angles, values, percentages, materials, degrees, product configuration, orientations, product layout, component locations, sizes, number of sections, number of components or items, etc. can be chosen and used and all are considered within the scope of the invention.

It will be seen that the objects set forth above, and those made apparent from the foregoing description, are efficiently attained and since certain changes may be made in the above construction without departing from the scope of the invention, it is intended that all matters contained in the foregoing description shall be interpreted as illustrative and not in a limiting sense. The instant invention has been shown and described herein in what is considered to be the most practical and preferred embodiment.

It should be understood that the exemplary embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from their spirit and scope.

Unless feature(s), part(s), component(s), characteristic(s) or function(s) described in the specification or shown in the drawings for a claim element, claim step or claim term specifically appear in the claim with the claim element, claim step or claim term, then the inventor does not consider such feature(s), part(s), component(s), characteristic(s) or function(s) to be included for the claim element, claim step or claim term in the claim when and if the claim element, claim step or claim term is interpreted or construed. Similarly, with respect to any "means for" elements in the claims, the inventor considers such language to require only the minimal amount of features, components, steps, or parts from the specification to achieve the function of the "means for" language and not all of the features, components, steps or parts describe in the specification that are related to the function of the "means for" language.

Dimensions and/or proportions of certain parts in the figures may have been modified and/or exaggerated for the purpose of clarity of illustration and are not considered limiting.

While the system and method has been described and disclosed in certain terms and has disclosed certain embodiments or modifications, persons skilled in the art who have acquainted themselves with the disclosure, will appreciate that it is not necessarily limited by such terms, nor to the specific embodiments and modification disclosed herein. Thus, a wide variety of alternatives, suggested by the teachings herein, can be practiced without departing from the spirit of the disclosure, and rights to such alternatives are particularly reserved and considered within the scope of the disclosure.

What is claimed is:

1. A valve assembly to improve accuracy of a water meter installed within a water line, the valve assembly comprising:

a one-piece external casing having an inlet and an outlet;

the casing defining a first internal chamber and a second internal chamber, the second internal chamber extending from the outlet of the casing to an intermediate point within the casing, the first internal chamber extending from the intermediate point to the inlet of the casing, the second internal chamber having a first diameter and the first internal chamber having a second diameter smaller in size than the first diameter, the diameter of the first internal chamber being smaller than the diameter of the second chamber to create an internal wall at the intermediate point within the external casing;

a stopper including a shaft and a plate having a first side and a second side, the shaft extending outward from the first side of the plate, the stopper positioned within the external casing; and a spring positioned around the shaft capable of exerting force on the first side of the plate;

a sealing member disposed within the casing adjacent to the second side of the plate;

wherein the spring in an expanded position causes the plate of the stopper to move within the casing and directly contact the sealing member such that the sealing member contacts the internal wall and effectively seals off fluid communication between the first internal chamber and the second internal chamber;

wherein an internal diameter of the second chamber beginning from an outlet end of the external casing and running to a closest end of the internal wall is virtually a same diameter throughout excluding an internal groove near the outlet end;

a connector secured to the external casing at the inlet of the external casing, the connector comprising an outer flange and a lip member, the outer flange extending outwardly and perpendicular to the external casing such that an outer diameter for the outer flange being larger in size than an outer diameter of the external casing, the lip member extending outwardly from the inlet and extending outwardly from and perpendicular to the outer flange and the lip member defining an opening having a diameter larger in size than the diameter of the first internal chamber, the opening of the lip member in communication with the first internal chamber, the opening of the lip member having a curved and concaved inner surface beginning at a lip member outer end and terminating at a lip member inner end adjacent to the first internal chamber, the lip member separate and independent from the first internal chamber and the lip member positioned adjacent to and extending outward from the first internal chamber, an outer diameter of the lip member smaller in size as compared to an outer diameter of the external casing.

2. The valve assembly of claim 1 wherein the connector is monolithically formed with the casing as a one-piece member.

3. The valve assembly of claim 1, wherein the plate of the stopper is positioned within the second chamber, the plate having an exterior diameter proximate to that of the diameter of the second chamber and larger than the diameter of the first chamber such that the plate remains within the second chamber at all times regardless of whether the valve assembly is in a valve opened position or a valve closed position.

4. The valve assembly of claim 1, wherein the stopper having one or more guides extending outward from the second side of the plate.

5. The valve assembly of claim 4, wherein the one or more guides are three or more guides that extend outward perpendicular to the second side of the plate, wherein the three or more guides are oriented to create a shape and size sufficient to conform to the internal diameter of the first chamber.

6. The valve assembly of claim 1, wherein the sealing member is an o-ring within a seating groove positioned proximate to the wall, the o-ring capable of effectuating a seal when pressed through direct contact with the second side of the plate when the spring is in an expanded position during a valve closed state.

7. The valve assembly of claim 1, further comprising a positioning member having at least one fluid flow openings secured directly to an inner surface of the casing within the second internal chamber and proximate to the outlet of the external casing, the positioning member having a central opening having a size sufficient to receive the shaft of the stopper, wherein the spring rests upon the positioning member, and wherein the one or more fluid flow openings allow fluid to flow through the outlet of the casing for removal from the valve assembly.

8. The valve assembly of claim 7, wherein the spring is capable of being compressed when the desired fluid flowing into the inlet is at a predetermined sufficient pressure such that the shaft of the stopper will be inserted and move within the central opening of the positioning member.

9. The valve assembly of claim 1 wherein the casing has a set of threads on an external surface near the outlet of the casing.

10. The valve assembly of claim 1, wherein the internal wall is an outwardly tapering internal wall.

11. The valve assembly of claim 1, wherein an internal diameter of the second chamber beginning from an outlet end of the external casing and running to a closest end of the internal wall is virtually a same diameter throughout excluding an internal groove near the outlet end.

12. The valve assembly of claim 1, wherein a diameter of the opening of the lip member at the lip member outer end larger in size than a diameter of the opening of the lip member at the lip member inner end.

13. The valve assembly of claim 1, wherein an internal diameter of the first chamber beginning from a first end adjacent to the second chamber and running to a second end adjacent to the lip member is virtually a same diameter throughout.

14. The valve assembly of claim 1, wherein an internal diameter of the first chamber beginning from a first end adjacent to the second chamber and running to a second end adjacent to the lip member is virtually a same diameter throughout.

15. The valve assembly of claim 1, wherein an internal diameter of the first chamber beginning from a first end adjacent to the second chamber and running to a second end adjacent to the lip member is virtually a same diameter throughout.

16. A valve assembly to improve accuracy of a water meter installed within a water line, the valve assembly comprising:
  a one-piece external casing having an inlet and an outlet;
  the casing defining a first internal chamber and a second internal chamber, the second internal chamber extending from the outlet of the casing to an intermediate point within the casing, the first internal chamber extending from the intermediate point to the inlet of the casing, the second internal chamber having a first diameter and the first internal chamber having a second diameter smaller in size than the first diameter, the diameter of the first internal chamber being smaller than the diameter of the second chamber to create an outwardly tapering internal wall at the intermediate point within the external casing;
  a stopper including a shaft and a plate having a first side and a second side, the shaft extending outward from the first side of the plate, the stopper positioned within the external casing; wherein the plate of the stopper is positioned within the second chamber, the plate having an exterior diameter proximate to that of the diameter of the second chamber and larger than the diameter of the first chamber;
  a spring positioned around the shaft capable of exerting force on the first side of the plate;
  a sealing member disposed within the casing adjacent to the second side of the plate;
  wherein the spring in an expanded position causes the plate of the stopper to move within the casing and directly contact the sealing member such that the sealing member contacts the internal wall and effectively seals off fluid communication between the first internal chamber and the second internal chamber; and, wherein an internal diameter of the second chamber beginning from an outlet end of the external casing and running to a closest end of the internal wall is virtually a same diameter throughout excluding an internal groove near the outlet end;
  a connector secured to the external casing at the inlet of the external casing, the connector comprising an outer flange and a lip member, the outer flange extending outwardly and perpendicular to the external casing, the lip member extending outwardly from the inlet and extending outwardly from and perpendicular to the outer flange and the lip member defining an opening having a diameter larger in size than the diameter of the first internal chamber, the opening of the lip member in communication with the first internal chamber, the opening of the lip member having a curved and concaved inner surface beginning at a lip member outer end and terminating at a lip member inner end adjacent to the first internal chamber, the lip member separate and independent from the first internal chamber and the lip member positioned adjacent to and extending outward from the first internal chamber, an outer diameter of the lip member smaller in size as compared to an outer diameter of the external casing.

17. The valve assembly of claim 16, wherein the stopper having one or more guides extending outward from the second side of the plate.

18. The valve assembly of claim 16, wherein the sealing member is an o-ring within a seating groove positioned proximate to the wall, the o-ring capable of effectuating a seal when pressed through direct contact with the second side of the plate when the spring is in an expanded position during a valve closed state.

19. The valve assembly of claim 16, further comprising a positioning member having at least one fluid flow openings secured directly to an inner surface of the casing within the second internal chamber and proximate to the outlet of the external casing, the positioning member having a central opening having a size sufficient to receive the shaft of the stopper, wherein the spring rests upon the positioning member, and wherein the one or more fluid flow opening allow fluid to flow through the outlet of the casing for removal from the valve assembly.

20. The valve assembly of claim 19, wherein the spring is capable of being compressed when the desired fluid flowing into the inlet is at a predetermined sufficient pressure such that the shaft of the stopper will be inserted and move within the central opening of the positioning member.

21. The valve assembly of claim 16, wherein an internal diameter of the second chamber beginning from an outlet end of the external casing and running to a closest end of the internal wall is virtually a same diameter throughout excluding an internal groove near the outlet end.

22. The valve assembly of claim 16, wherein a diameter of the opening of the lip member at the lip member outer end larger in size than a diameter of the opening of the lip member at the lip member inner end.

23. A valve assembly to improve accuracy of a water meter installed within a water line, the valve assembly comprising:
- a one-piece external casing having an inlet and an outlet;
- the casing defining a first internal chamber and a second internal chamber, the second internal chamber extending from the outlet of the casing to an intermediate point within the casing, the first internal chamber extending from the intermediate point to the inlet of the casing, the second internal chamber having a first diameter and the first internal chamber having a second diameter smaller in size than the first diameter, the diameter of the first internal chamber being smaller than the diameter of the second chamber to create an outwardly tapering internal wall at the intermediate point within the external casing;
- a stopper including a shaft and a plate having a first side and a second side, the shaft extending outward from the first side of the plate, the stopper positioned within the external casing;
- a spring positioned around the shaft capable of exerting force on the first side of the plate;
- a sealing member disposed within the casing adjacent to the second side of the plate;
- wherein the spring in an expanded position causes the plate of the stopper to move within the casing and directly contact the sealing member such that the sealing member contacts the internal wall and effectively seals off fluid communication between the first internal chamber and the second internal chamber; and
- a positioning member having at least one fluid flow openings secured directly to an inner surface of the casing within the second internal chamber and proximate to the outlet of the external casing, the positioning member having a central opening having a size sufficient to receive the shaft of the stopper, wherein the spring rests upon the positioning member, and wherein the one or more fluid flow openings allow fluid to flow through the outlet of the casing for removal from the valve assembly;
- wherein the spring is capable of being compressed when the desired fluid flowing into the inlet is at a predetermined sufficient pressure such that the shaft of the stopper will be inserted and move within the central opening of the positioning member;
- wherein an internal diameter of the second chamber beginning from an outlet end of the external casing and running to a closest end of the internal wall is virtually a same diameter throughout excluding an internal groove near the outlet end;
- a connector secured to the external casing at the inlet of the external casing, the connector comprising an outer flange and a lip member, the outer flange extending outwardly and perpendicular to the external casing, the lip member extending outwardly from the inlet and extending outwardly from and perpendicular to the outer flange and the lip member defining an opening having a diameter larger in size than the diameter of the first internal chamber, the opening of the lip member in communication with the first internal chamber, the opening of the lip member having a curved and concaved inner surface beginning at a lip member outer end and terminating at a lip member inner end adjacent to the first internal chamber, the lip member separate and independent from the first internal chamber and the lip member positioned adjacent to and extending outward from the first internal chamber, an outer diameter of the lip member smaller in size as compared to an outer diameter of the external casing.

24. The valve assembly of claim 23, wherein the plate of the stopper is positioned within the second chamber, the plate having an exterior diameter proximate to that of the diameter of the second chamber and larger than the diameter of the first chamber.

25. The valve assembly of claim 23, wherein the stopper having one or more guides extending outward from the second side of the plate.

26. The valve assembly of claim 23, wherein the sealing member is an o-ring within a seating groove positioned proximate to the wall, the o-ring capable of effectuating a seal when pressed through direct contact with the second side of the plate when the spring is in an expanded position during a valve closed state.

27. The valve assembly of claim 23, wherein a diameter of the opening of the lip member at the lip member outer end larger in size than a diameter of the opening of the lip member at the lip member inner end.

* * * * *